United States Patent [19]
Dankworth et al.

[11] Patent Number: 5,354,990
[45] Date of Patent: Oct. 11, 1994

[54] IN-SITU LOCALIZED TRACER INJECTION/FIBER OPTIC DETECTION FOR MEASUREMENT OF FLOW DISTRIBUTIONS IN FIXED BED REACTORS

[75] Inventors: David C. Dankworth, Whitehouse Station; Robert M. Koros, Westfield, both of N.J.

[73] Assignee: Exxon Research & Engineering Co., Florham Park, N.J.

[21] Appl. No.: 63,393

[22] Filed: May 18, 1993

[51] Int. Cl.$^5$ .................. G01F 1/00; G01F 1/66
[52] U.S. Cl. .................. 250/356.1; 250/302; 422/220
[58] Field of Search .......... 250/356.1, 356.2, 302, 250/303, 458.1; 422/220

[56] References Cited
U.S. PATENT DOCUMENTS

| | | |
|---|---|---|
| 2,826,699 | 3/1958 | Hull . |
| 2,943,045 | 6/1960 | Hull et al. . |
| 3,199,346 | 8/1965 | Stewart . |
| 3,727,048 | 4/1973 | Haas . |
| 4,055,083 | 10/1977 | Haas .................. 250/356.1 |
| 4,153,418 | 5/1979 | Haas .................. 250/356.1 |
| 4,304,752 | 12/1981 | Jenkins et al. .......... 250/304 |
| 4,575,185 | 3/1986 | Wentzell et al. . |
| 4,621,929 | 11/1986 | Phillips . |
| 4,654,803 | 3/1987 | Sell . |
| 4,778,988 | 10/1988 | Henderson . |
| 5,182,051 | 1/1993 | Brandy et al. .......... 250/308 |
| 5,243,190 | 9/1993 | Brandy et al. .......... 250/356.2 |

Primary Examiner—Puaul M. Dzierzynski
Assistant Examiner—Drew A. Dunn
Attorney, Agent, or Firm—Joseph J. Dvorak

[57] ABSTRACT

The distribution of fluid flowing through a packed bed reactor is determined by placing a plurality of fiber optic sensors at desired locations within the packed bed reactor. A light analyzable tracer component is injected into the fluid flowing through the reactor. Light is supplied to each of the sensors causing any tracer component in the vicinity of the sensor to emit electromagnetic radiation. The emitted electromagnetic radiation is detected at each fiber optic sensor, thereby permitting the amount of tracer in the vicinity of each sensor to be determined, and consequently providing a measure of the distribution of fluid flowing through the reactor.

11 Claims, 2 Drawing Sheets

IN-SITU LOCALIZED TRACER INJECTION/FIBER OPTIC DETECTION FOR MEASUREMENT OF FLOW DISTRIBUTIONS IN FIXED BED REACTORS

FIELD OF THE INVENTION

This invention relates to a method and apparatus for measuring fluid flow rates in a packed bed reactor.

BACKGROUND OF THE INVENTION

Many chemical processes are conducted by flowing fluid reactants, such as a gas and a liquid, through a reactor vessel filled with a solid, such as a solid catalyst. In these processes, the efficiency of the chemical reaction is dependent upon how uniform the fluid flowing through the vessel is distributed. Therefore, the ability to measure the liquid distribution in a packed bed reactor is particularly useful in designing and operating these reactors.

In U.S. Pat. No. 4,750,357, there is disclosed a method of measuring local fluid flow rates in a packed catalytic reactor which is equipped with heated thermocouple probes. In operation, a temperature measurement is obtained first with the heater off and then a second temperature measurement is obtained with the heater on. The difference between the two temperatures is used to calculate the thermal mass flux. This procedure, of course, requires time to line out the probe for each step and permits measurement only at discreet time intervals. Thus, there remains a need for an improved method and apparatus that is capable of operating continuously and which provides a measure of mass flux directly, especially without the need for heating the probe used in the measurements.

SUMMARY OF THE INVENTION

In its simplest sense, the distribution of fluid flowing through a packed bed reactor is determined by placing a plurality of fiber optic sensors at desired locations within the packed bed reactor. A light analyzable tracer component is injected into the fluid flowing through the reactor. Light is supplied to each of the sensors causing any tracer component in the vicinity of the sensor to emit electromagnetic radiation. The emitted electromagnetic radiation is detected at each fiber optic sensor, thereby permitting the amount of tracer in the vicinity of each sensor to be determined, and consequently providing a measure of the distribution of fluid flowing through the reactor.

In a particularly preferred embodiment of the present invention, the main flow of fluid entering into the reactor is constant and the mass flow rate of the tracer is also constant, thereby permitting the determination of hydrodynamic parameters, such as liquid and gas velocity and liquid holdup in the vessel.

These and other features of the invention will become more readily apparent upon reading of the "Detailed Description of the Invention" in conjunction with the drawings.

DETAILED EMBODIMENT OF THE INVENTION

Figure 1:
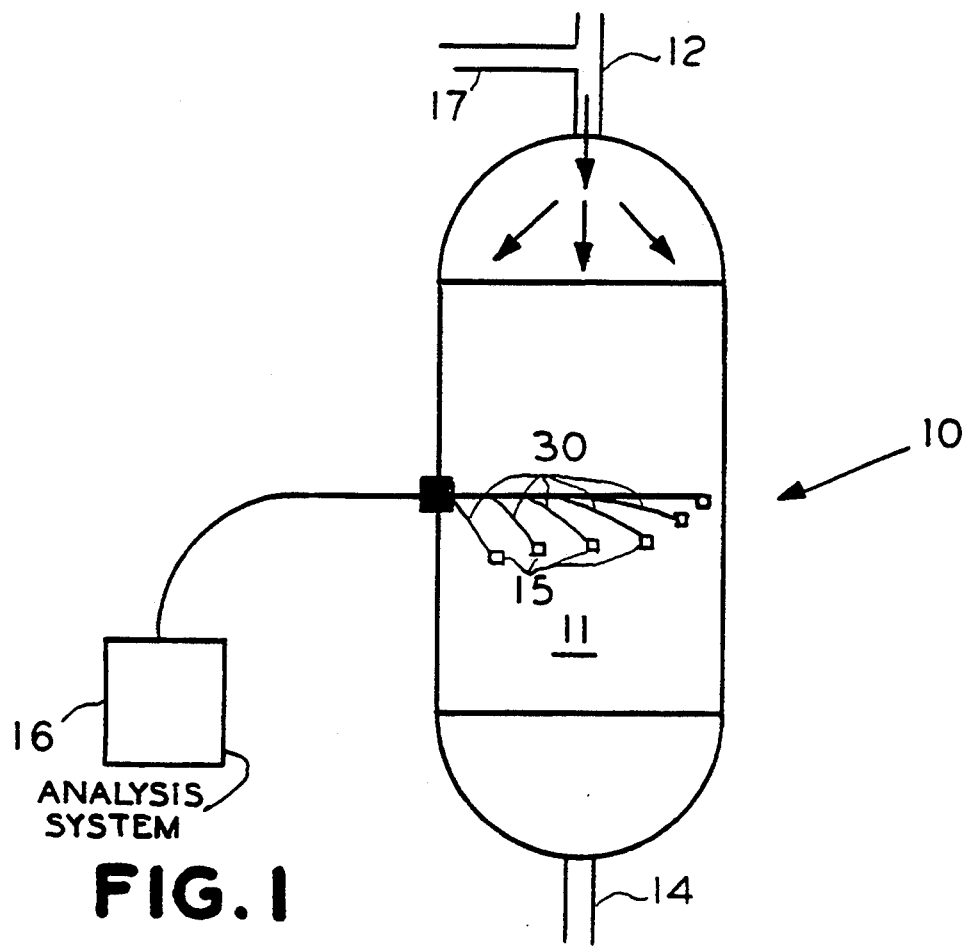
FIG. 1 is a schematic illustration of a packed bed reactor provided with fiber optic sensor means, in accordance with the present invention.

Referring first to FIG. 1, there is shown a generally vertical cylindrical reactor vessel 10 which contains a fixed bed of particulate solids 11, such as a catalyst. The vessel is provided with a top fluid inlet 12 by means of which a main flow of fluid is introduced for flow through the solids 11 in vessel 10. Vessel 10 also is provided with a bottom fluid outlet 14 for the removal of fluid after it has passed through the vessel bed. A plurality of fiber optic sensors 15 are placed at desired locations within the packed bed. These sensors 15 are in communication with a detection and analysis system 16 via optic cables 30 which will be described in greater detail hereinafter.

Figure 2:
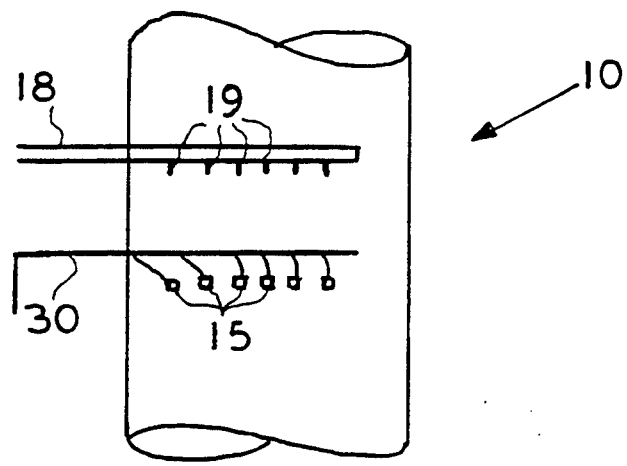
FIG. 2 is a partial schematic illustration of a preferred embodiment of the present invention showing means for injecting an analyzable tracer component at locations spaced vertically above each of a plurality of fiber optic sensors.

Means are provided for introducing an analyzable tracer component into the main flow of fluid entering into the vessel 10. In one embodiment of the present invention, this is accomplished by means of a conduit 17 communicating with inlet 12. In a preferred embodiment shown in FIG. 2, the means for introducing light analyzable tracer component within the bed is a horizontally disposed pipe 18 having a plurality of downwardly directed nozzles 19, which are capable of releasing the tracer component under pressure. In this embodiment it is especially preferred to provide one nozzle 19 for each sensor 15. In general the nozzles will be spaced at a distance from the sensor in the range of about 25 to 1000 or more particulate solids diameters and preferably at a distance of from about 50 to about 100 particulate solids.

Figure 3:
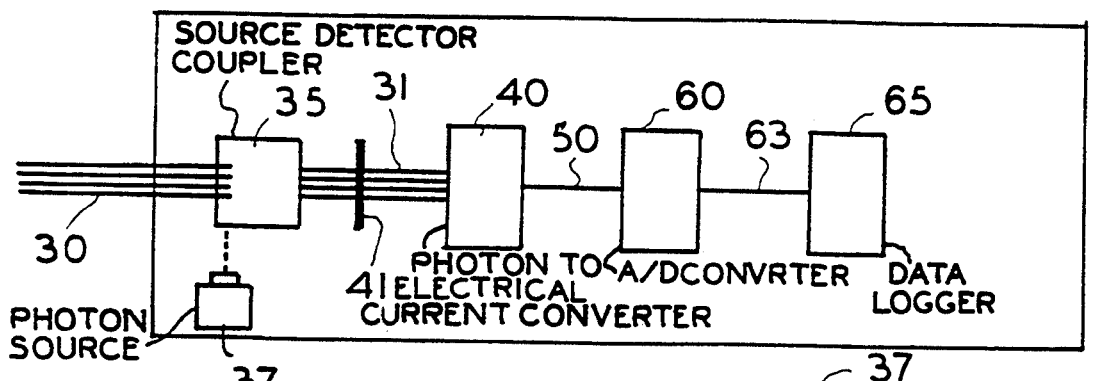
FIG. 3 is a schematic illustration of a fiber optic detector system suitable in the practice of the present invention.

Turning now to FIG. 3, there is shown a typical fiber optic detector system suitable in the practice of the present invention. The system includes a plurality of fiber optic cables 30 having a first end extend into the reactor vessel terminating at optical sensors 15. The optical sensors 15 may be any of a number of well known devices. For example, they may be of the extrinsic type optical sensors in which they deliver light from a source and transmit the resulting signal, or the sensors may be of the intrinsic type in which a special coating that is active toward the tracer surrounds the light conductor.

Returning to the detection system, cables 30 have a second end each of which communicates with a photon source 37 via a photon source/detector coupler 35. A plurality of fiber optic cables 31 operably connect the coupler 35 of each cable 30 with a photon to electric current converter 40.

In one embodiment of the invention cables 31 includes filters 41 to screen particular wavelengths to enhance the signal to noise ratio.

The electrical signal from each converter 40, which is related to the photon radiation intensity, is transmitted through wire pair 50, to an analog-to-digital converter A/D 60, to be digitized. The A/D converter 60 may be a multiplexing or multichannel converter. The digitized signal is carried by a wire pair, 63, to a data logger, 65, such as a computer which can record and process the digital information.

Figure 4:
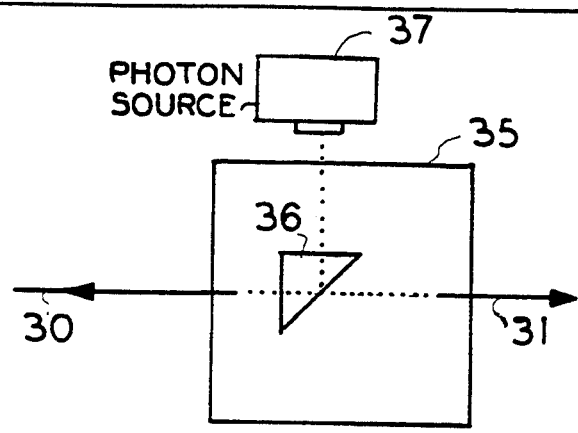
FIG. 4 is a schematic illustration of a probe, including a plurality of fiber optic detectors, a light source and a light detection system.
Figure 5:
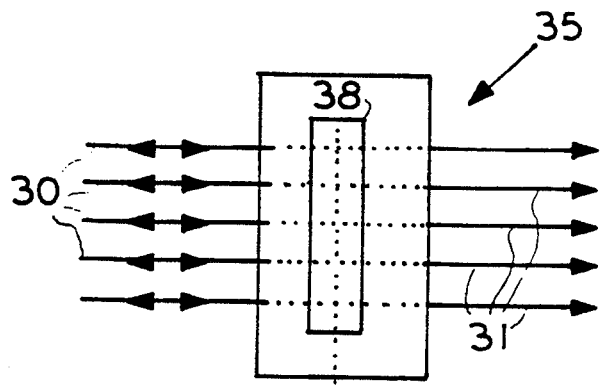
FIG. 5 is a schematic illustration of an optical and electronic system for supplying light to the fiber optic detector and for measuring light at a wavelength matching that of the emitted electromagnetic radiation of the tracer element.

Turning to FIG. 4 there is shown one embodiment of a photo source/detector coupler 35 which includes a prism 36 which allows photon to pass from the photon source 37 through fiber cable 30 to the interior of the vessel 10 while also transmitting light via cable 30 from sensor 15. The light detected or transmitted from sensor 15 exits the coupler 35 via cable 31. In the embodiment shown in FIG. 5 multiple strands 30 are optically coupled to the photon source 37 via a single prism 38.

Figure 6:
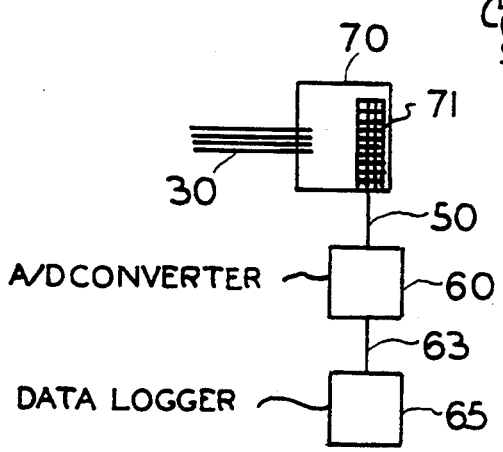
FIG. 6 is a schematic illustration of an alternate optical detection system suitable in the practice of the present invention.

In an alternate embodiment of the invention shown in FIG. 6 the optical photon signal sensed by each optical sensor 15 is carried by cables 30 to a detection screen 70, such as the face of a video camera. The photon flux intensity at each spot on the camera face is converted to an electrical signal. The individual signals are scanned and individually identified by coordinate system 71. This analog signal is sent via line 50 to an analog/digital converter 60 where it is digitized and then sent via line 63 to the recorder/-analyzer 65.

In the practice of the present invention any suitable photon source 37 may be employed. Typically, however, the photon source 37 will be a laser.

Suitable light analyzable tracer components used in the practice of the present invention preferably are compounds that are thermally stable and non-reactive under conditions of use and which emit electromagnetic radiation at a wavelength which is different from that of other species present in the reactor vessel and, when the optical sensor is of the intrinsic type, will interact with a coating on the sensor. Typical tracer components include alkylsulfides, aromatic sulfides, $H_2S$ and $NH_3$.

In the practice of the present invention the tracer component may be fed continuously into the vessel or intermittently.

What is claimed is:

1. A method for determining the distribution of a main flow of fluid introduced into a reactor containing a bed of particulate solids for flow therethrough, the method comprising:
   placing a plurality of fiber optic sensors at desired locations within the bed of particulate solids;
   feeding a main flow of fluid into the reactor for flow through the reactor;
   injecting a light analyzable tracer component into the main flow of fluid whereby the tracer component is distributed with the main flow of fluid;
   stimulating the tracer component in the vicinity of a fiber optic sensor to emit electromagnetic radiation;
   transmitting the emitted electromagnetic radiation to a detector;
   detecting the transmitted electromagnetic radiation to determine that the light analyzable tracer material is in the vicinity of each sensor and thereby providing a measure of the distribution of fluid flowing through the reactor.

2. The method of claim 1 wherein the tracer component is stimulated by supplying photons to each sensor whereby any tracer component in the vicinity of the sensor is excited to emit electromagnetic radiation.

3. The method of claim 1 wherein the tracer component is stimulated by providing a sensor having a coating thereon which is electromagnetically active toward the tracer component whereby contact of the sensor by the tracer component results in emissions of electromagnetic radiation.

4. The method of claim 1 wherein the light analyzable tracer component is injected into the main flow of fluid at a point above the packed bed.

5. The method of claim 1 wherein the light analyzable tracer component is injected into the main flow of fluid at a plurality of locations within the bed vertically located above the fiber optic detectors.

6. The method of claim 1 wherein the tracer component is injected at a constant rate.

7. The method of claim 1 wherein the tracer component is intermittently fed into the main flow of fluid.

8. An apparatus for determining the distribution of a main flow of fluid introduced into a reactor containing a bed of particulate solids for flow therethrough comprising:
   a vessel containing a bed of particulate solids;
   a plurality of fiber optic sensors located within the bed of solids;
   a photon detector for each sensor;
   fiber optic cables communicating with the sensors and with the photon detectors;
   means for introducing a light analyzable tracer component in the bed for flow therethrough;
   means for stimulating the tracer component in the vicinity of a sensor whereby electromagnetic radiation is emitted, sensed by a sensor and transmitted by the optical cable by a photon detector; and
   means for analyzing the photon detected by each detector whereby the distribution of flow of fluid is determined.

9. The apparatus of claim 8 wherein the means for analyzing the photons detected is a computer.

10. The apparatus of claim 9 wherein the means for stimulating the tracer component is a photon source coupled with the photon detector for supplying photons to the optical sensors through the fiber optic cables.

11. The apparatus of claim 8 wherein the means for stimulating the tracer component is a coating on the sensors that is electromagnetically active toward the tracer component.

* * * * *